United States Patent
Liu et al.

(10) Patent No.: US 9,483,840 B1
(45) Date of Patent: Nov. 1, 2016

(54) LOW POWER PATCH MATCHING IN SELF-SIMILARITY BASED SINGLE FRAME SUPER-RESOLUTION

(71) Applicant: Pixelworks, Inc., Portland, OR (US)

(72) Inventors: Guodong Liu, Shanghai (CN); Junhua Chen, Shanghai (CN); Jiehua Shen, Shanghai (CN); Lihang Zhang, Shanghai (CN); Bob Zhang, Santa Clara, CA (US); Yue Ma, Pleasanton, CA (US)

(73) Assignee: PIXELWORKS, INC., Portland, OR (US)

( * ) Notice: Subject to any disclaimer, the term of this patent is extended or adjusted under 35 U.S.C. 154(b) by 192 days.

(21) Appl. No.: 14/036,671

(22) Filed: Sep. 25, 2013

(51) Int. Cl.
  *G06T 7/20* (2006.01)
(52) U.S. Cl.
  CPC ..................................... *G06T 7/204* (2013.01)

(58) Field of Classification Search
  USPC .......................... 345/428; 382/298, 299, 264
  See application file for complete search history.

(56) References Cited

U.S. PATENT DOCUMENTS

| | | | |
|---|---|---|---|
| 8,687,923 B2 * | 4/2014 | Lin et al. ....................... | 382/298 |
| 2011/0206296 A1 * | 8/2011 | Sakaguchi et al. ........... | 382/299 |
| 2011/0293146 A1 * | 12/2011 | Grycewicz .................... | 382/106 |
| 2012/0328210 A1 * | 12/2012 | Fattal et al. .................. | 382/264 |
| 2013/0071040 A1 * | 3/2013 | Jin et al. ....................... | 382/254 |
| 2013/0301933 A1 * | 11/2013 | Salvador et al. ............. | 382/205 |

* cited by examiner

*Primary Examiner* — Kimbinh T Nguyen
(74) *Attorney, Agent, or Firm* — Marger Johnson

(57) ABSTRACT

A method of generating a super-resolution image from a single frame of image data includes using a processor to retrieve query patches of image data from a memory, determining a search range for each patch, and generating super-resolution image data corresponding to each patch based upon the search range.

14 Claims, 6 Drawing Sheets

LOW POWER PATCH MATCHING IN SELF-SIMILARITY BASED SINGLE FRAME SUPER-RESOLUTION

BACKGROUND

Display panels or monitors continue to increase in resolution, such as 1080p, 4k×2k, etc. Many image sources have a lower resolution than the displays. When the panel displays these sources in a display with higher resolution, traditional scaling techniques do not produce high fidelity results with rich details and sharp edges. Examples of these traditional techniques include one-dimensional poly phase scaling (1D scaler), bilinear interpolation, bi-cubic interpolation, edge-guided (2D) scaling, etc. Super resolution techniques offer a solution to bridge the gap between advanced, higher resolution displays and lower resolution video sources.

Multi-image super resolution techniques construct a high resolution image from multiple low resolution images by fusing information among them. These algorithms can bring some details with smaller ratios of magnification in zooming. When larger ratios of magnification are needed, they cannot give enough details. Further, even at smaller ratios, if the motion is not in the right range, the ability of these techniques to reconstruct high frequency details suffers. These techniques also require many hardware resources and complex logic.

Different types of single frame super resolution (SFSR) techniques exist. Typically, these processes may involve using comparisons between the original low resolution image and various scaled versions of the low resolution image to generate the high resolution image at the desired magnification, or higher resolution. The processes may generate intermediate layers of image data at resolutions between the original input resolution and the desired high resolution, and may generate image layers at resolutions below the original image resolution. These layers are searched for matches in the image data and corresponding data may be copied between one of the intermediate layers and the desired high resolution image layer. This process is called patch matching.

However, patch matching has high computational requirements as it involves searching algorithms and detailed data analysis. Techniques that can lower the computational requirements while maintaining good image quality for the high resolution image would be desirable.

DETAILED DESCRIPTION OF THE EMBODIMENTS

Figure 1:
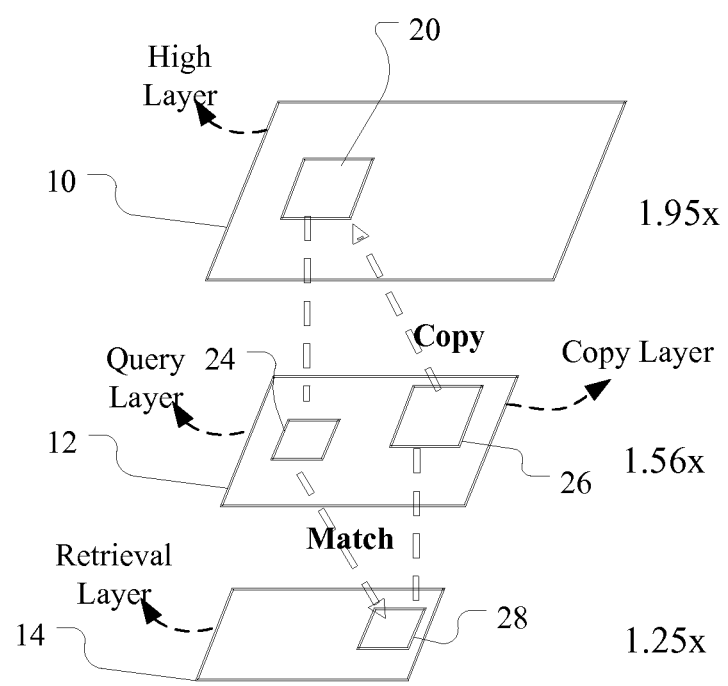
FIG. 1 shows an example of a self-similarity based upscaling process for single frame super-resolution.

FIG. 1 shows an example of a self-similarity based upscaling for single frame super-resolution. The high resolution image layer 10, where an image layer is a set of data at a particular resolution, in this example is 1.95 times (1.95×) the original resolution of the input image. The intermediate layers between the original image layer and the desired super-resolution layer are 1.25 times the original resolution, the 1.25× retrieval layer 14, and 1.56 times the original resolution, the 1.56× query layer 12. In this particular example, the identified pixel or patch in the high resolution layer 20 has a corresponding location at 24 in the 1.56× layer, and fetches a query patch at this location. A matching patch 28 is found in the retrieval layer 14, where the matching patch is based upon the image content. The patch 28 in layer 14 corresponds to the location of patch 26 in layer 12, which is then used to copy up to the high resolution layer 10 at location 20. A more detailed discussion of this process may be found in co-pending U.S. patent application Ser. No. 14/011,532, "Self-Similarity Based Single Frame Super-Resolution," filed Aug. 27, 2013.

In this example, the query layer and the copy layer are the same. In other approaches the query layer and copy layers may be different layers, there may be many kinds of combination between query and copy layers for self-similarity based upscaling. This discussion merely provides information on one example of single frame self-similarity super-resolution. No limitation to this particular approach to patch matching is intended, nor should any be implied.

The patch matching process consumes resources of the display system, using high levels of processing power and taking quite a bit of time. For systems having limited resources such as smart phones and tablets, these factors limit the usefulness of the super-resolution process. It is possible to analyze the patch to determine whether or not patch matching should be performed, and if it should, the process can apply more efficient techniques to generate the super-resolution image than those of conventional patch matching.

Figure 2:
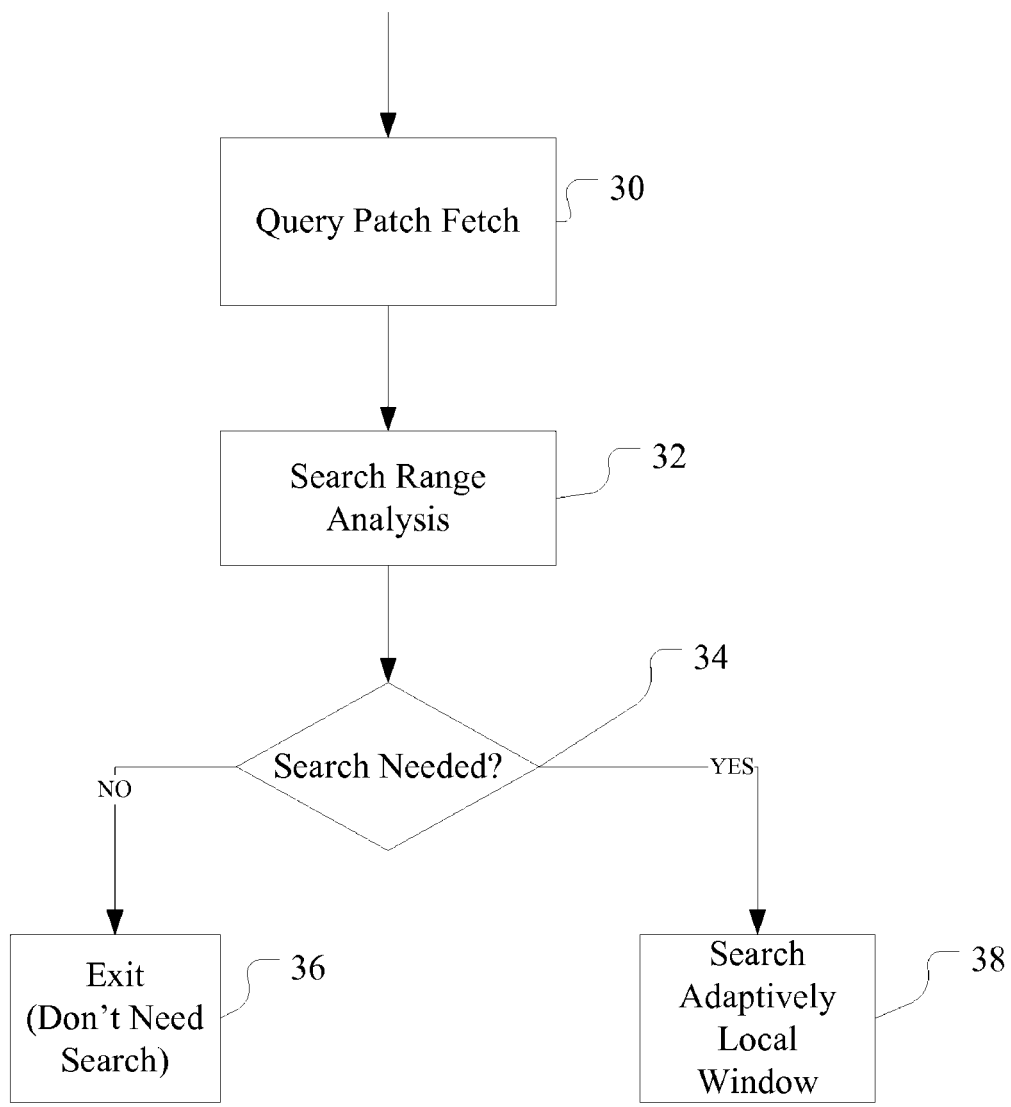
FIG. 2 shows a flowchart of an embodiment of a low power patch matching for single frame self-similarity based super-resolution process.

FIG. 2 shows an embodiment of a method of low power patch matching for self-similarity based super-resolution. Generally, this process will be implemented using a processor, with the image data for the various layers stored in a memory. The current patch to be matched under a super-resolution process is fetched at 30. Prior to actually performing the patch match process, the process first determines a search range to determine if the patch search and match process is even necessary.

Figure 3:
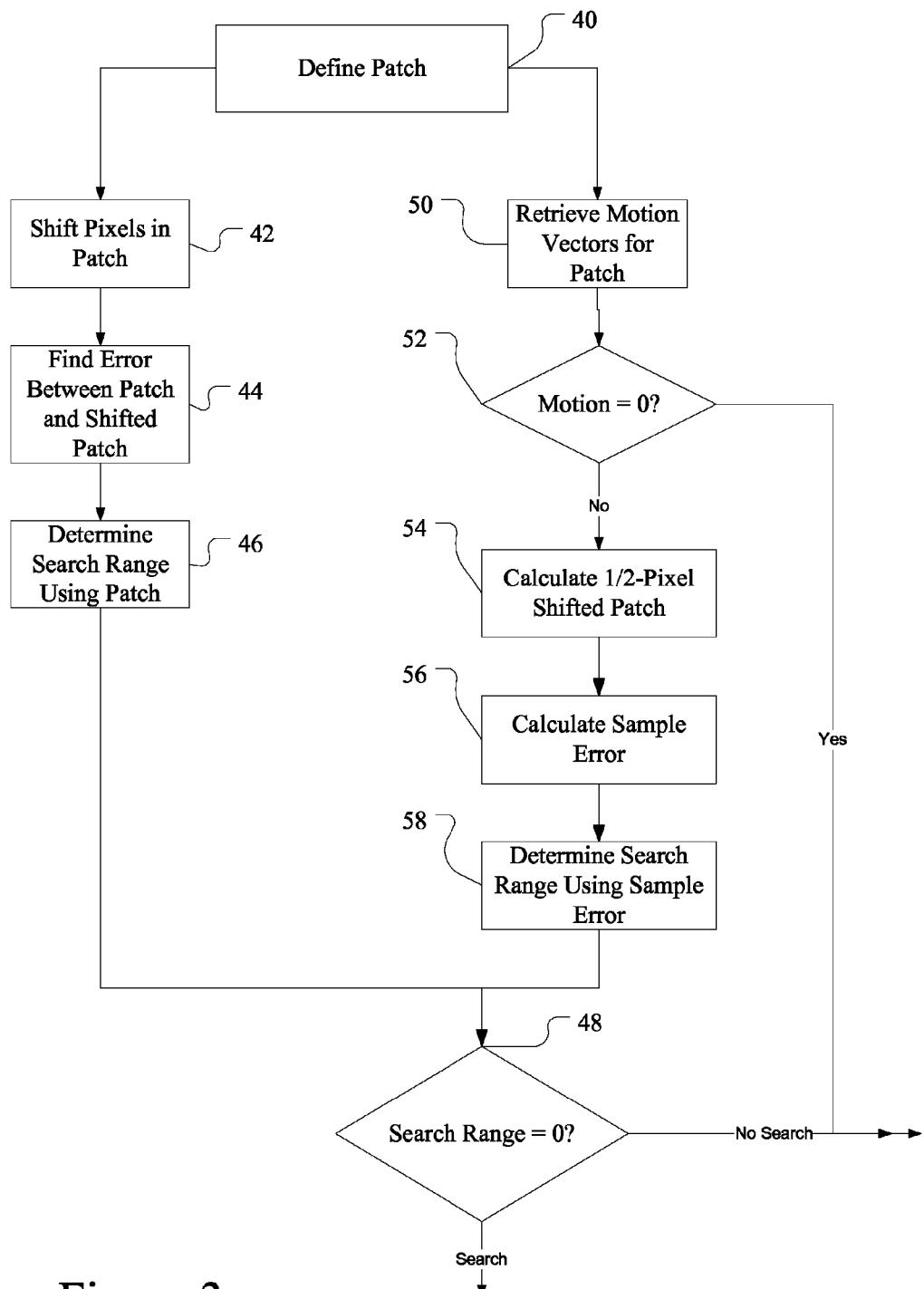
FIG. 3 shows a flowchart of an embodiment of a search range analysis method.
Figure 4:
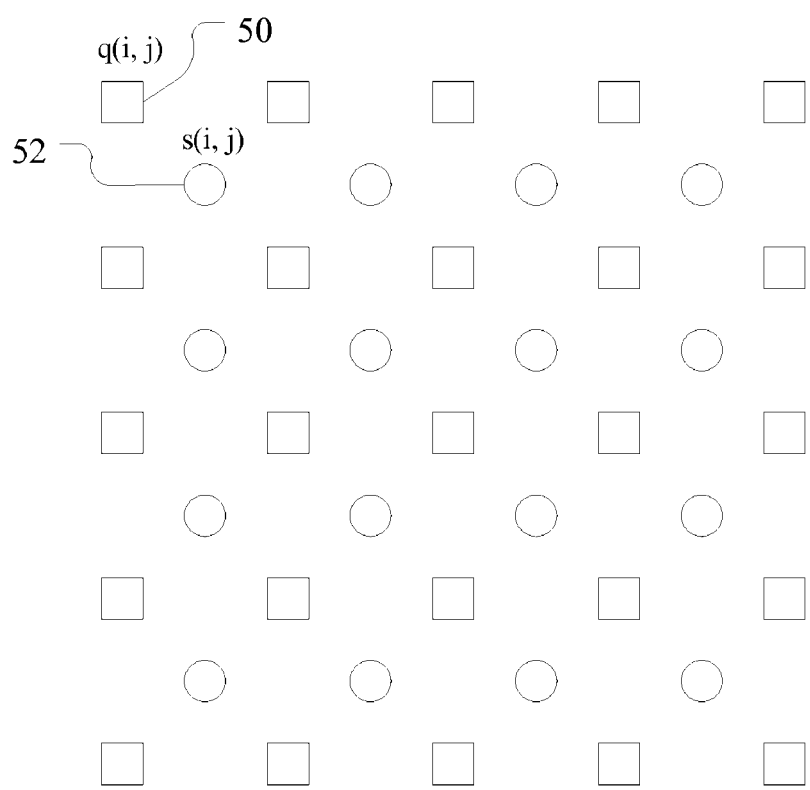
FIG. 4 shows an example of an original patch and its half-pixel interpolation patch.

FIG. 3 shows a more detailed view of an embodiment of this analysis. At 40, a 4×4 query patch Q is fetched. From many experiments, 4×4 is most appropriate size for patch matching. In one embodiment the patch is extended to a 5×5 pixel patch towards right and bottom. The term 'search range analysis' as used here means any analysis that assists in determining whether or not the patch matching process needs to continue and if so, in how big of an area. In one approach, the pixels in the patch are shifted some fractional portion of a pixel at 42. FIG. 4 shows a graphic example of this shift. In this embodiment, the squares represent the original pixel patch, having coordinates q(i, j) such as pixel 50, and the circles represent the shifted pixels in the patch having coordinates s(i, j) such as pixel 52, shifted one half-pixel. The pixel at s(i, j) is generated by bilinear interpolation of its neighboring int-pixels (integer pixels), typically 4 int-pixels.

Returning to FIG. 3, the process calculates the sample error between the patch and the shifted patch.

$$\text{samp\_err} = \sum_{i=0, j=0}^{i<4, j<4} \text{abs}(q(i, j) - s(i, j))$$

at 44. The sample error is to evaluate how strong the textures and edges in current patch are.

The process then defines the maximal horizontal and vertical search range at 46, with the search range to be MaxSearchRng_H and MaxSearchRng_V respectively. The cur_h_search_range and cur_v_search_range are the solved horizontal and vertical search ranges respectively for query patch Q. The search range decision logic is as following:
search_range_k=min(max(samp_err/16−SampErrThr, 0)*SearchRngK,                                                            1)
cur_h_search_range=MaxSearchRng_H*search_range_k;
cur_v_search_range=MaxSearchRng_V*search_range_k.
Here, search_range_k is gain to normalize samp_err. That is, the more textures and edges the patch has, the bigger the search range is. So, if there is no or little textures or edges, the patch does not need to do any searching. If there are rich textures or edges, it needs to search in a bigger local window. Once the search range is found in this embodiment, it is checked to see if the search range is zero at 48.

For patch Q, patch matching is done in the range of [−cur_v_search_range, cur_v_search_range]*[−cur_h_search_range, cur_h_search_range]. As the search range decreases, less logic is required to do the patch matching. Therefore, the clock to that section of the logic can be gated off to save power. Alternatively, it might be possible to finish the search faster and then gate the clock off for the entire section of logic or start the next patch sooner and then gate the clock off at the end of the line. The result is that power is saved as the search range is either reduced from the entire possible search range or eliminated completely.

As mentioned above, a different type of search range analysis can rely on motion between adjacent frames instead. Motion vectors are usually calculated for motion-compensation based de-noising, frame rate conversion or multi-frame super-resolution, etc. If the process can determine that the area of the image in which the current patch resides has no motion, it would not need to perform patch matching. Instead it would use the super resolution result for the previous image. At 50 in FIG. 3, the process retrieves the motion vectors for the path. The process then checks the motion vectors to determine if the 'amount' of motion is zero or near zero. The determination of what constitutes a 'still' portion of the image may be based upon thresholds of motion, such as a number of non-zero motion vectors, or a summation of motion vector values, the Sum of Absolute Differences (SAD) calculated for the motion vectors etc.

The motion would be calculated for the query layer. If there is little or no motion, however that is defined, the patch matching would be skipped for that patch and the super-resolution result for the previous image would be used instead. Otherwise, the process determines the search range based on the sample error at 54, 56 and 58, as performed as for those pixels in 42, 44 and 46.

Returning to FIG. 2, one should note that the determination of whether a search should be done may take other forms from those discussed in FIG. 3. If the result from the search range analysis in at 32 in FIG. 2 is that a search is not needed at 34, the process generates the super-resolution image data using a simple method such as a one-dimensional scaler (1D scaler) with high quality filters. If the process determines that a search is needed at 34, the process moves on to perform the patch search at 38 and generate the self-similarity super-resolution data.

Figure 5:
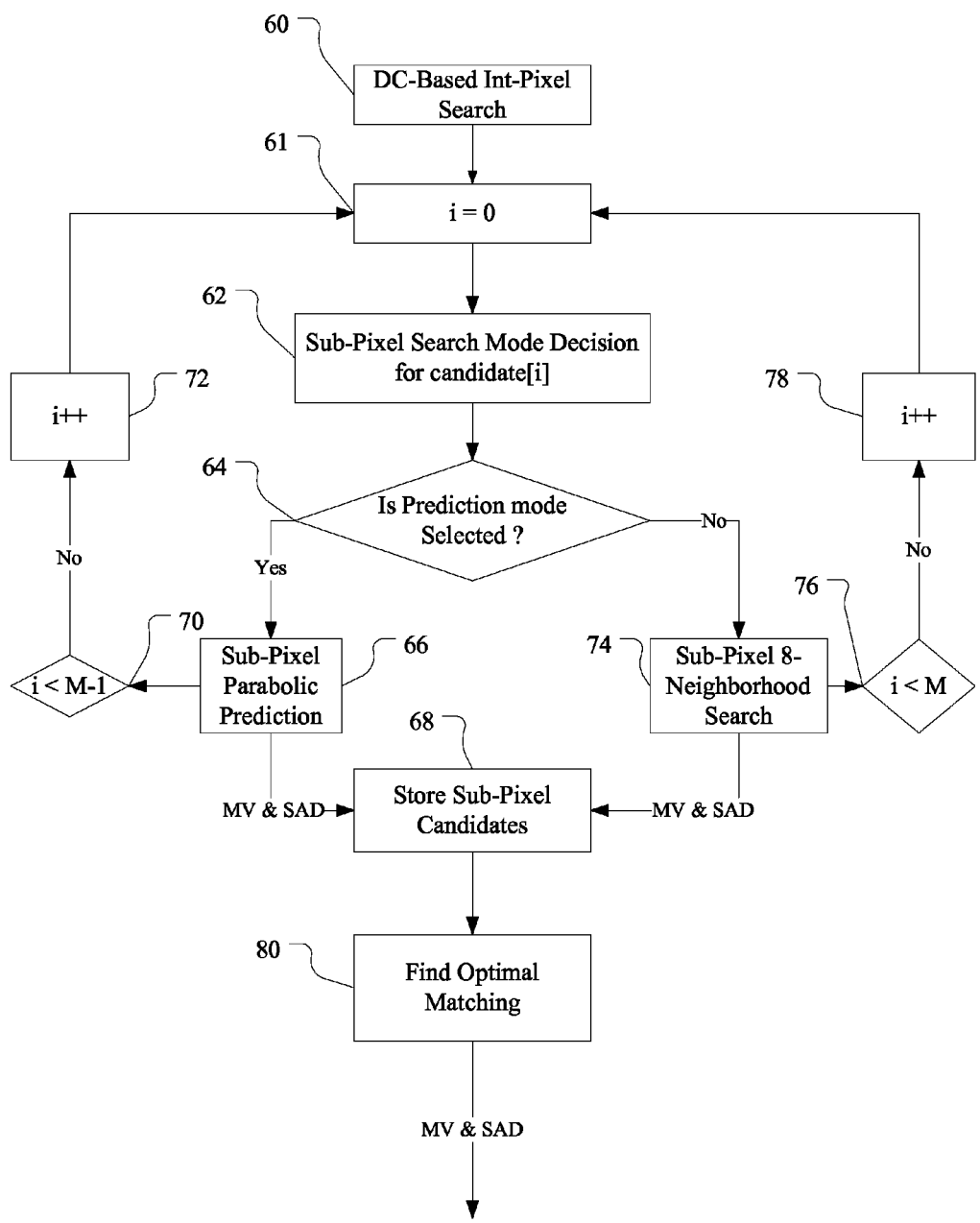
FIG. 5 shows an embodiment of a highly efficient patch searching in an adaptive-range local window.

FIG. 5 shows an embodiment of a patch search process that saves computing resources and power. For each query patch Q, an int-pixel (integer pixel) search is processed in a local search window in the retrieval layer. Instead of computing SAD between query patch Q and a retrieval patch R, the process calculate the absolute difference between their DC, or steady-state, parts. The DC part is the pixel average in the patch. The DC part is calculated for each int-pixel patch in retrieval layer and stored in the memory shown at 60 in FIG. 5. After determining the current search range in retrieval layer, the DC parts in search window are fetched for comparison with DC of the query patch. After finishing the comparison between the DC parts, the process selects some predetermined number of patches, such as the 25% of the retrieval patches that have minimal DC absolute difference.

In most situations, the DC absolute difference will have a high consistency with its patch SAD. In other words, if two patches are similar, both the DC absolute difference and the patch SAD are small. This is because both are measuring a mismatch in content between patches. It should be obvious to one skilled in the art, that there are a variety of ways to generate statistics that measure the matching errors. For example, sum of square differences are used in linear regression. One could also normalize the per pixel match errors before summing to obtain a fuzzy logic or probability value. The choice is usually determined by the accuracy and cost requirements of the process. In this case, using the lowest cost method (DC absolute difference) to reduce the set of patches to search and then using a more expensive method to make the final decision provides a good balance between cost and accuracy. In the following discussion, the higher quality matching errors will be found using SAD and the lower quality matching errors by the DC absolute difference, but no limitation to this approach is intended nor should one be implied.

From many experiments, several of the most matched patches can be found from the selected 25% retrieval patches that have minimal DC absolute differences. In order to find these most optimal patches, it is generally more efficient to calculate the SAD between query patch and these 25% patches. This reduces about 75% of the SAD calculations compared to doing SAD calculation in whole search window. Because the SAD calculation of the patch is computationally costly in patch matching, decreasing the number of SAD calculations will save a lot of power. After finishing the DC based int-pixel search, one or multiple patches with minimal SAD are selected as similar patches. For example, assume M, typically no more than 4, patches are selected. The process then calculates SAD between 4-neighborhood patches of these M patches and current query patch. These SAD are used to determine whether to use parabolic sub-pixel prediction.

Because int-pixel matching is only suitable for some smooth regions, it is better to do sub-pixel searching for patches with strong texture or edges. Traditionally, computing the SAD between the query patch and neighboring patches of int-pixel matched patches at sub-pixel position is appropriate for finding the similar patches. However, it is computational costly and time consuming. If the sub-pixel position can be predicted, it can save a lot of power.

The use of parabolic fitting can predict sub-pixel matching position based on the SADs of five neighboring int-pixel patches: the matched one, and its top, bottom, left and right ones. This occurs for each int-pixel candidate i, beginning at

Figure 6:
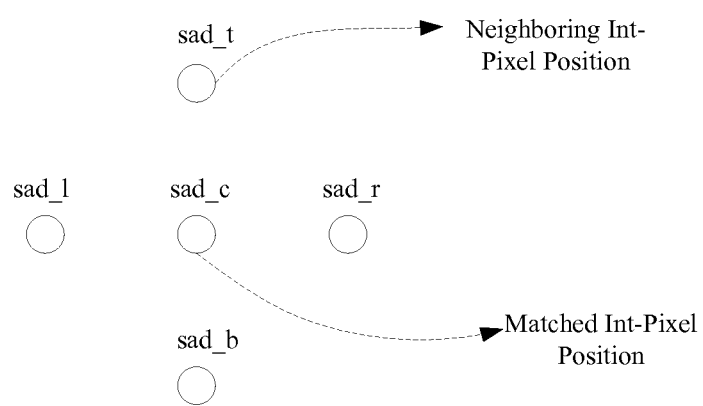
FIG. 6 shows an example of position relationships among neighboring int-pixel patches for parabolic prediction.

61 in FIG. 5. FIG. 6 shows the position relationship among neighboring int-pixel patches.

For a matched int-pixel patch, if none of its neighboring SADs are big, where there is no big abrupt change of SAD, and the sample error is not big, the process can use parabolic prediction to calculate sub-pixel offset of matching as determined at 62. If this is possible, then the more calculative intensive way of doing sub pixel refinement can be skipped to save power.

If parabolic fitting prediction is appropriate at 64, the process calculates the sub-pixel offsets for horizontal and vertical respectively at 66. This discussion uses the horizontal sub-pixel prediction as example. First, the process calculates:

$$denorm=\max(sad\_l+sad\_r-2*sad\_c,1)*2;$$

$$numer=(sad\_l-sad\_r).$$

then it calculates the sub-pixel offset dx. If either of sad_c, sad_l and sad_r is very large, it is not appropriate to do prediction, so dx=0. Otherwise, if sad_c is less than sad_l and sad_r, the prediction is done as $$dx=numer/denorm.$$

Otherwise, if sad_l<sad_r, the process prefers to shift optimal matching position towards the left, for example, dx=−0.5, or it prefers to shift optimal matching position towards the right, for example, dx=0.5.

The process then adjusts the position of the patch with sub-pixel offset, and calculates the SAD of sub-pixel candidate. It compares the SAD of the sub-pixel candidate and the SAD of int-pixel candidate sad_c, and selects the one with minimal SAD, output the corresponding pixel offset (i.e., motion vector). The results are stored at 68. As it is seen, only one sub-pixel SAD is calculated.

If parabolic fitting is not appropriate at 64, the process applies the SAD rule at 74 to work on the sub-pixel offset. The process calculates the SAD of patches in ½-pixel 8-neighborhood and selects the position with the minimal SAD. The SADs of ¼-pixel 8-neighborhoods surrounding that ½-pixel position are then calculated, and the position with the minimal SAD is selected. These results are stored at 68. Finally, the process finds the optimal matching patch 80 for copying up to the super-resolution layer. Compared to the SAD based sub-pixel 8-neighborhood search, sub-pixel parabolic prediction saves about 15 SAD calculation for each int-pixel offset (MV) candidate.

In this manner, the super-resolution image is generated using much less power. The more computationally costly super-resolution patch matching and copying is performed less frequently than other approaches. This allows for conservation of computational and power resources.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method of generating a super-resolution image from a single frame of image data, comprising:
    using a processor to retrieve query patches of image data from a memory;
    defining, for each patch, a size of a search range to find a match based upon the image content of the patch, wherein the size of the search range is one of a horizontal range and a vertical range based upon a sample error, or set to zero when there is no motion in the patch;
    determining whether to perform patch matching, based upon the size of the search range; and
    generating super-resolution image data corresponding to each patch for which patch matching is to be performed.

2. The method of claim 1, wherein generating super-resolution image data comprises using a result from a previous frame of super-resolution image data when there is no motion in the patch.

3. The method of claim 1, further comprising determining motion exists in the patch.

4. The method of claim 3, wherein generating super-resolution image data comprises using self-similarity super-resolution.

5. The method of claim 1, wherein the sample error indicates strength of textures and edges for the current patch and using the sample error to define the search range.

6. The method of claim 1, wherein determining the search range for the patch comprises determining the search range based upon the sample error is zero.

7. The method of claim 6, wherein generating super-resolution image data comprises upscaling image data with a filter in the patch.

8. The method of claim 1, wherein generating super-resolution image data comprises:
    using a first patch matching error measure to find a subset of patches within the search range;
    searching within the subset using a second patch matching error measure, wherein the first patch matching error measure has lower accuracy and uses less power than the second patch matching error measure.

9. The method of claim 8, wherein the first patch matching error measure comprises an average difference between a pixel average of each of each of the query patches and a pixel average of corresponding retrieval patches.

10. The method of claim 8, wherein the second patch matching error comprises a sum of absolute differences between each of the query patches and corresponding retrieval patches.

11. The method of claim 8, further comprising performing sub-pixel matching on the selected patches.

12. The method of claim 11, wherein sub-pixel matching comprises:
    identifying the matching errors of the integer pixel patch and the neighborhood patches for the integer patch that are below a difference threshold and a sample error below an error threshold;
    applying parabolic fitting to the matching errors identified to produce sub-pixel matches;
    calculating sub-pixel matching errors between the sub-pixel patches and the corresponding query patches;
    comparing the sub-pixel matching errors of the sub-pixel patches and the integer pixel patches; and
    determining the sub-pixel patch with the minimal sub-pixel matching error as a matched patch.

13. The method of claim 12, further comprising:
    generating a neighborhood of patch at a fractional pixel level;
    determining matching errors between the patches at fractional pixel level and the query patch;
    selecting a position having a minimal matching error; and
    determining the position as a sub-pixel matching position.

14. The method of claim 13, wherein generating a neighborhood at a fractional pixel level comprises:
- generating the neighborhood at a ½ pixel level;
- identifying an optimal ½-pixel position; and
- generating a second neighborhood at a ¼ pixel level around the optimal ½ pixel position.

* * * * *